United States Patent
Fushiki et al.

(10) Patent No.: US 6,903,742 B1
(45) Date of Patent: Jun. 7, 2005

(54) METHOD AND APPARATUS FOR TRANSFORMING AND RENDERING GRAPHICAL CURVES

(75) Inventors: Ikko Fushiki, Redmond, WA (US); Hock San Lee, Redmond, WA (US); J. Andrew Goossen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/452,658

(22) Filed: Dec. 1, 1999

(51) Int. Cl.[7] .............................................. G06T 11/20
(52) U.S. Cl. ..................................................... 345/443
(58) Field of Search ................................. 345/440–443, 345/647, 657, 679; 382/293, 292, 151, 294, 291, 277, 285, 301

(56) References Cited

U.S. PATENT DOCUMENTS

| | | | | |
|---|---|---|---|---|
| 4,805,117 A | * | 2/1989 | Fiore et al. | 345/679 |
| 4,985,849 A | * | 1/1991 | Hideaki | 345/657 |
| 5,175,808 A | * | 12/1992 | Sayre | 345/647 |
| 5,367,617 A | | 11/1994 | Goossen et al. | 395/142 |
| 5,717,848 A | * | 2/1998 | Watanabe et al. | 395/174 |
| 6,100,894 A | * | 8/2000 | Goel | 345/423 |
| 6,226,418 B1 | * | 5/2001 | Miller et al. | 382/294 |
| 6,271,864 B1 | * | 8/2001 | Graham | 345/442 |
| 6,542,157 B1 | * | 4/2003 | Browne | 345/441 |

\* cited by examiner

Primary Examiner—Michael Razavi
Assistant Examiner—Hwa C. Lee
(74) Attorney, Agent, or Firm—Theodore M. Magee; Westman, Champlin & Kelly, P.A.

(57) ABSTRACT

The present invention provides a method and apparatus for rendering images on a computer screen. Under the invention, a portion of a base image is described using a path. The path is then transformed using a non-affine transform to produce a transformed path. The transformed path is then rendered onto the computer screen. Another aspect of the present invention is a method and apparatus for rendering curves of any order and any dimension. In particular, the present invention provides a means for converting a function of any order and any dimension that describes one segment of a curve into a function that describes a different sized segment or an adjoining segment.

23 Claims, 11 Drawing Sheets

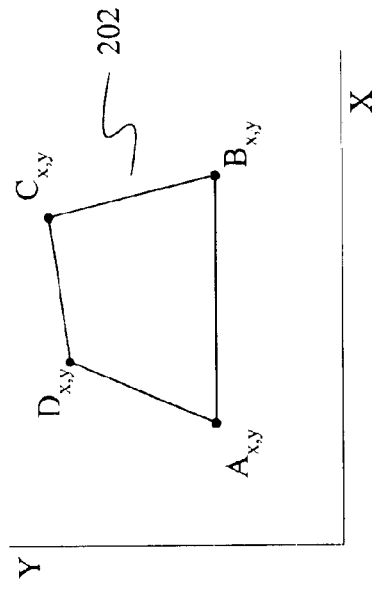
FIG. 1A
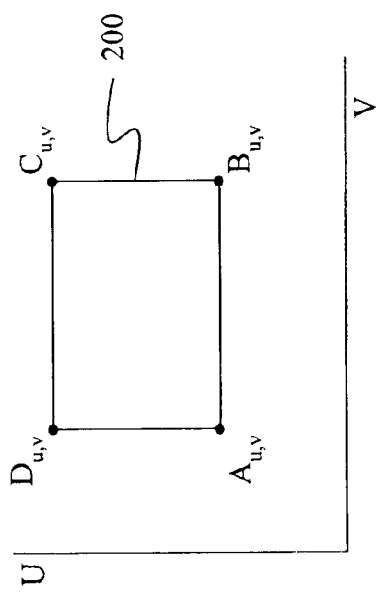
FIG. 2A
(PRIOR ART)
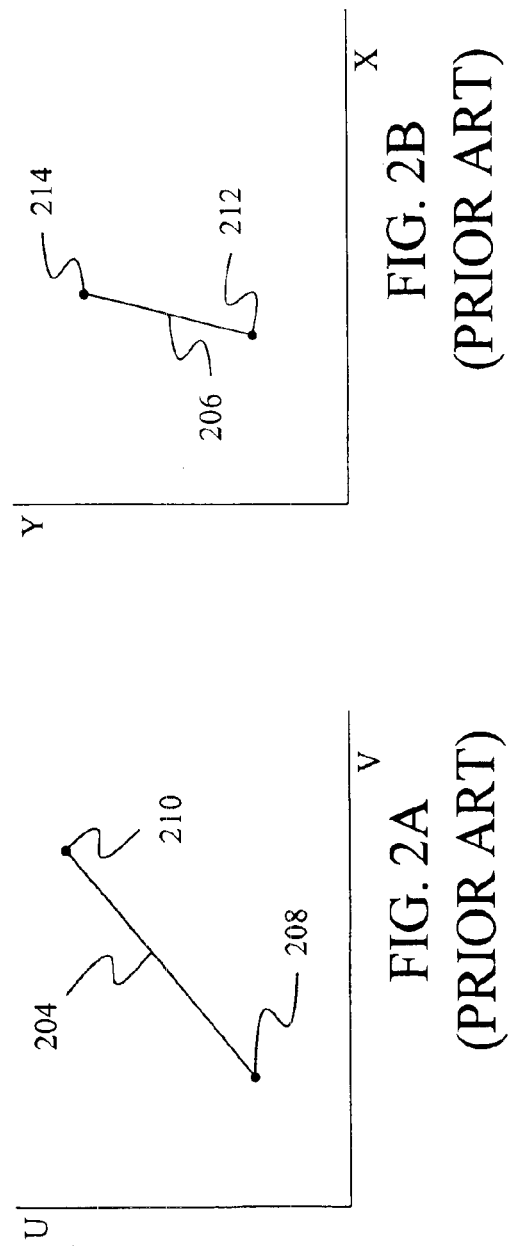
FIG. 1B
FIG. 2B
(PRIOR ART)

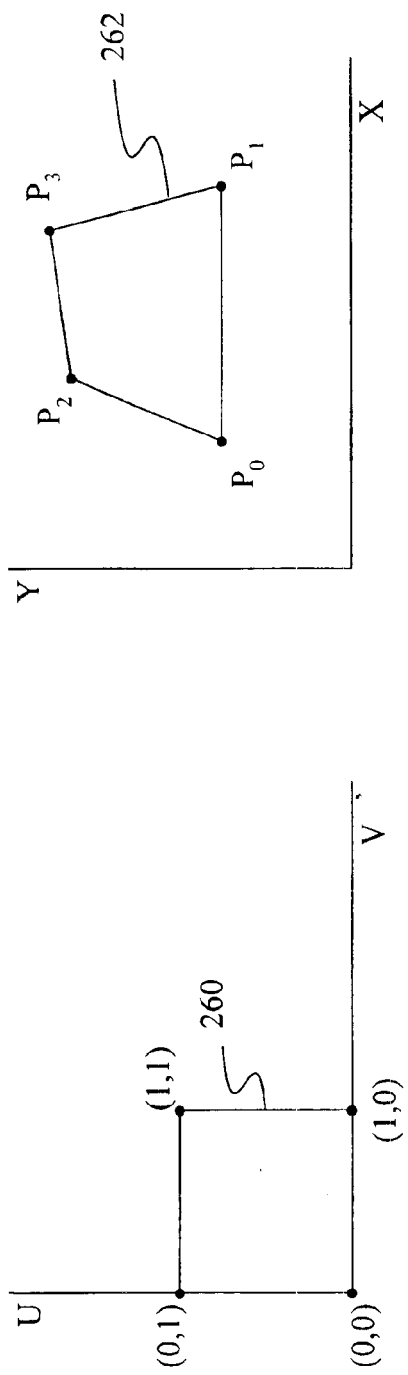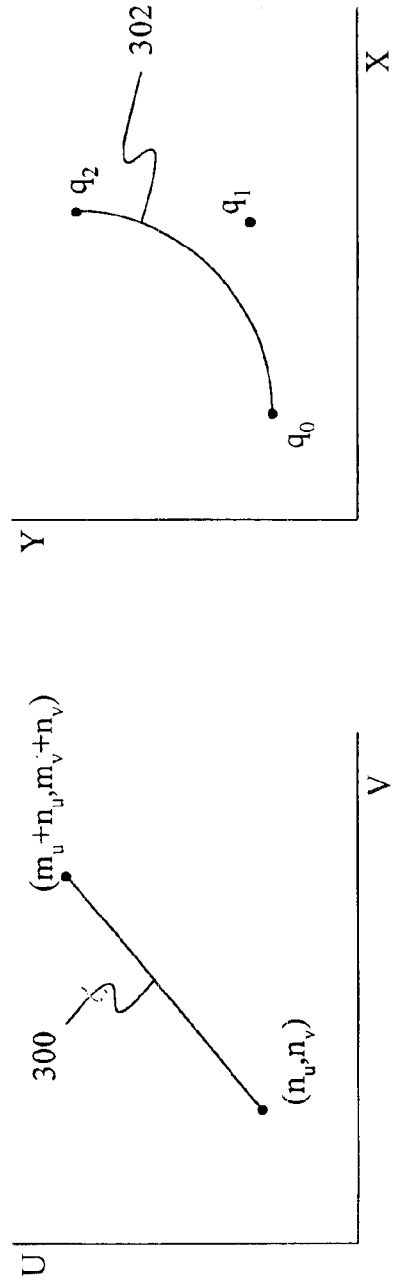

METHOD AND APPARATUS FOR TRANSFORMING AND RENDERING GRAPHICAL CURVES

REFERENCE TO RELATED APPLICATION

The present application is related to a co-pending application U.S. Ser. No. 09/452,422, filed on even-date herewith and owned by a common assignee. The related application is entitled "WARPING TEXT ALONG A CURVED PATH".

BACKGROUND OF THE INVENTION

The present invention is related to computer graphing systems. In particular, the present invention is related to transforming and rendering shapes on a computer output device.

Many of the images that appear on a computer screen or on a computer-printed page are generated by passing a base image through some form of transform. This technique allows a computer to display many different versions of the base image without storing all of the versions in long-term memory. For example, using a single base image of the letter "b", a computer can generate large versions of the letter, can change the location or orientation of the letter on the display or page, or can skew the letter by slanting its top to the left or to the right.

In two-dimensional graphics, transforms have historically been limited to affine transforms where all parallel lines in the base image remain parallel in the transformed image. Affine transforms include scaling, rotating, skewing, and translating (i.e. changing location).

Two techniques have been developed for performing affine transforms. In one technique, each pixel of the base image is transformed separately by transforming the coordinates of the pixel. Thus, if there were one hundred pixels in an image, one hundred transforms would be performed. In the other technique, pixels within a base image are described using a set of equations known as a path. Typically, the x-coordinates of the pixels are described using one equation and the y-coordinates of the pixels are described using a separate equation. These paths are then transformed to produce a new set of equations that describe the pixels of the transformed image.

Recently, more complex non-affine transforms have been developed, which provide a three-dimensional appearance to two-dimensional objects. In a non-affine transform, lines that are parallel in the base image do not necessarily remain parallel in the transformed image. Because of the complexity of these transforms, only pixels have been transformed in the prior art. To transform more complex curves, the prior art transforms selected points along the curve and then connects the transformed points together to construct the transformed curve.

This technique for performing non-affine transforms is less than ideal because a large number of data points must be transformed for very complex curves. In addition, the exact description of the curve is lost in the transform. This can cause the curve to appear jagged in the transformed space, especially if further transforms are performed on the points approximating the curve.

SUMMARY OF THE INVENTION

The present invention provides a method and apparatus for rendering images on a computer screen. Under the invention, a portion of a base image is described using a path. The path is then transformed using a non-affine transform to produce a transformed path. The transformed path is then rendered onto the computer screen.

Another aspect of the present invention is a method for rendering curves of any order and any dimension. In particular, the present invention provides a means for converting a function of any order that describes one segment of a curve into a function that describes a different sized segment or an adjoining segment.

BRIEF DESCRIPTION OF THE DRAWINGS

FIGS. 1A and 1B show a non-affine transform of a square from u,v space to x,y space under the prior art.

FIGS. 2A and 2B show a non-affine transform of a line from u,v space to x,y space under the prior art.

FIGS. 4A and 4B show a transform of a unit square in u,v space into a quadrilateral in x,y space that defines a non-affine transform.

FIGS. 5A and 5B show a bilinear transform of a line under an embodiment of the present invention.

DETAILED DESCRIPTION OF ILLUSTRATIVE EMBODIMENTS

FIGS. 1A and 1B are graphs of two different two-dimensional spaces that define a base image space and a non-affine transform image space, respectively. FIG. 1A shows the base image space, which is described by two orthogonal coordinates u,v and that contains a square 200 defined by four corner points $A_{u,v}$, $B_{u,v}$, $C_{u,v}$, and $D_{u,v}$. FIG. 1B shows the non-affine transform space, which is described by two orthogonal coordinates x,y and that contains a quadrilateral 202 defined by four corner points $A_{x,y}$, $B_{x,y}$, $C_{x,y}$, and $D_{x,y}$. The differences between quadrilateral 202 and square 200 define the transform. In other words, passing the points of square 200 through the transform results in quadrilateral 202. Since the transform may be described by the four corner points of the quadrilateral, this type of non-affine transform is sometimes referred to generically as a "quad" transform.

FIGS. 2A and 2B show graphs of a line 204 in the base image space that is transformed into a line 206 in the non-affine transform space using a technique of the prior art. Under the prior art, two end points 208 and 210 of the base image are transformed to form two end points 212 and 214 in the transformed space. These end points are then connected together to form transformed line 206. Although this technique provides an accurate transform of line 204 for some non-affine transforms, for most non-affine transforms, line 206 is different from the curve that would be generated if every point along line 204 were transformed independently.

Figure 3B:
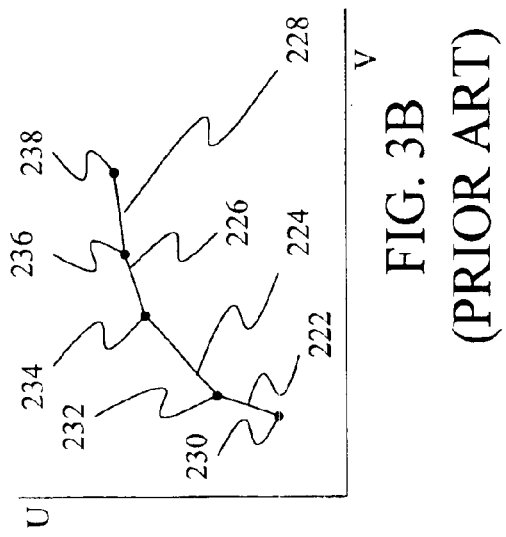
FIG. 3B shows a series of lines that approximates the curve of FIG. 3A in u,v space under the prior art.
Figure 3C:
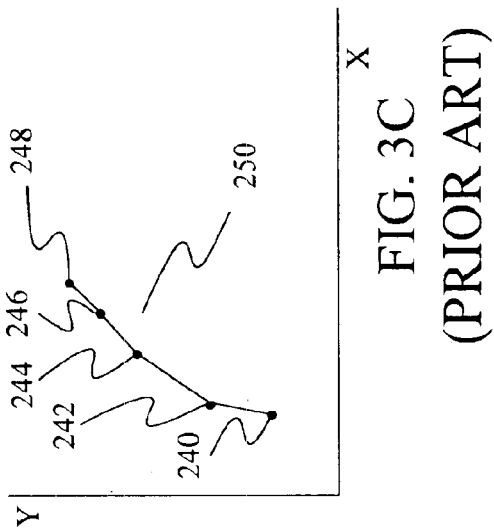
FIG. 3C shows a non-affine transform of each of the lines of FIG. 3B into x,y space under the prior art.
Figure 3A:
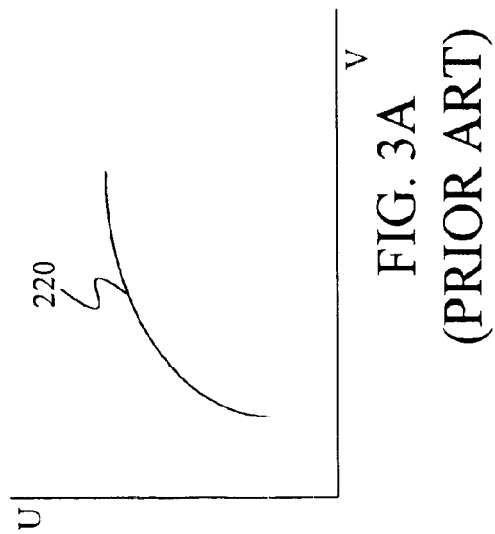
FIG. 3A shows a curve in u,v space.

FIGS. 3A, 3B and 3C show graphs depicting the prior art technique for transforming more complex curves using a non-affine transform. FIG. 3A shows a curve 220 of the base image. Under the prior art, curve 220 was transformed by representing the curve as a series of straight lines 222, 224, 226, and 228, in the base image space as shown in FIG. 3B. The endpoints of these lines were then transformed to form a set of transformed endpoints. Thus, endpoints 230, 232, 234, 236, and 238 of FIG. 3B were transformed into transformed endpoints 240, 242, 244, 246 and 248 of FIG. 3C. These endpoints were then connected together to form the transformed curve 250.

Under the prior art, transformed curve 250 is an inaccurate approximation of the curve that would be produced if every point along curve 220 were transformed individually. In addition, because the curve is converted into a set of selected points, the description of the curve is lost during the transform process. Because of this, transformed curve 250 can appear jagged under the prior art.

The present invention overcomes the problems of the prior art by providing a means for transforming a set of equations that describe curves and lines in a base image instead of the individual points of the base image. This produces a more accurate non-affine transform and retains the description of curves in the base image so that the curve appears smoother in the transform space.

Two non-affine transforms known as bilinear and perspective are of particular interest under the present invention. Although both are "quad" transforms, they each have different properties from each other. In a bilinear transform, a square box is transformed into a quadrilateral such that any point along an edge of the square becomes a point on the edge of the quadrilateral and the point's relative position on the square edge is the same as its relative position on the quadrilateral edge. Thus, if a point's location along a square edge is one quarter the distance of the square edge, the transformed point's location will be one quarter the distance of the quadrilateral edge. In a perspective transform, the two-dimensional base image is transformed into a three-dimensional image. The three-dimensional image is then projected onto a two-dimensional surface to generate the transformed image.

Bilinear Transforms

Under one embodiment of the present invention, a bilinear transform is performed by transforming equations that describe the two coordinates of a curve. In most embodiments, the equations that describe the coordinates are functions of t, where t has values between zero and one. Thus, in a u, v coordinate system:

$$u=f_u(t) \quad \text{EQ. 1}$$

$$v=f_v(t) \quad \text{EQ. 2}$$

Each coordinate x, y in the transform space is formed by combining Equations 1 and 2 using coordinate specific transform functions of the form:

$$x=uv\alpha_x+u\beta_x+v\gamma_x+\delta_x \quad \text{EQ. 3}$$

$$y=uv\alpha_y+u\beta_y+v\gamma_y+\delta_y \quad \text{EQ. 4}$$

where the constants, $\alpha_x$, $\beta_x$, $\gamma_x$, $\delta_x$, $\alpha_y$, $\beta_y$, $\gamma_y$, and $\delta_y$, are determined from the corner points of a quadrilateral formed by transforming a base image square having corners at u,v coordinates of 0,0, 0,1, 1,0, and 1,1. FIG. 4A shows a graph of such a unit square 260 in u,v space and FIG. 4B shows a resulting transform quadrilateral 262, which is defined by corners $P_0$, $P_1$, $P_2$, and $P_3$. Based on FIGS. 4A and 4B, the constants of Equations 3 and 4 are defined as:

$$\alpha_x=p_{0,x}-p_{1,x}-p_{2,x}+p_{3,x} \quad \text{EQ. 5}$$

$$\hat{a}_x=-p_{0,x}+p_{1,x} \quad \text{EQ. 6}$$

$$\tilde{a}_x=-p_{0,x}+p_{2,x} \quad \text{EQ. 7}$$

$$\ddot{a}_x=p_{0,x} \quad \text{EQ. 8}$$

$$\acute{a}_y=p_{0,y}-p_{1,y}-p_{2,y}+p_{3,y} \quad \text{EQ. 9}$$

$$\hat{a}_y=-p_{0,y}+p_{1,y} \quad \text{EQ. 10}$$

$$\tilde{a}_y=-p_{0,y}+p_{2,y} \quad \text{EQ. 11}$$

$$\ddot{a}_y=p_{0,y} \quad \text{EQ. 12}$$

where a subscript x designates the x coordinate of the point and a subscript y designates the y coordinate of the point.

Using equations 1 and 2 above, a line in the base image can be defined as:

$$u=tm_u+n_u \quad \text{EQ. 13}$$

$$v=tm_v+n_v \quad \text{EQ. 14}$$

where $(n_u, n_v)$ is the starting point of the line and $(m_u+n_u, m_v+n_v)$ is the ending point of the line. An example of a line described by Equations 13 and 14 is shown as line 300 in FIG. 5A.

Combining equations 13 and 14 with equations 3 and 4 produces a set of transformed equations:

$$x=(tm_u+n_u)(tm_v+n_v)\acute{a}_x+(tm_u+n_u)\hat{a}_x+(tm_v+n_v)\tilde{a}_x+\ddot{a}_x \quad \text{EQ. 15}$$

$$y=(tm_u+n_u)(tm_v+n_v)\acute{a}_y+(tm_u+n_u)\hat{a}_y+(tm_v+n_v)\tilde{a}_y+\ddot{a}_y \quad \text{EQ. 16}$$

which describe the x and y coordinates of a transformed curve. Equations 15 and 16 can be re-written as:

$$x=c_{2,x}t^2+c_{1,x}t+c_{0,x} \quad \text{EQ. 17}$$

$$y=c_{2,y}t^2+c_{1,y}t+c_{0,y} \quad \text{EQ. 18}$$

where:

$$c_{2,x}=m_u m_v \acute{a}_x \quad \text{EQ. 19}$$

$$c_{1,x}=(m_u n_v+m_v n_u)\acute{a}_x+m_u \hat{a}_x+m_v \tilde{a}_x \quad \text{EQ. 20}$$

$$c_{0,x}=n_u n_v \acute{a}_x+n_u \hat{a}_x+n_v \tilde{a}_x+\ddot{a}_x \quad \text{EQ. 21}$$

$$c_{2,y}=m_u m_v \acute{a}_y \quad \text{EQ. 22}$$

$$c_{1,y}=(m_u n_v+m_v n_u)\acute{a}_y+m_u \hat{a}_y+m_v \tilde{a}_y \quad \text{EQ. 23}$$

$$c_{0,y}=n_u n_v \acute{a}_y+n_u \hat{a}_y+n_v \tilde{a}_y+\ddot{a}_y \quad \text{EQ. 24}$$

Equations 17 and 18 show that a bilinear transform of a straight line results in a second order curve under the present invention. FIG. 5B shows a graph of a second order curve 302 produced by performing a bilinear transform of straight line 300 of FIG. 5A. This second order curve may be described using a Bezier notation in which the curve is described relative to a set of three control points $q_0$, $q_1$, and $q_2$. Using the Bezier notation, equations 17 and 18 become:

$$x = q_{0,x}(1-t)^2 + q_{1,x}2t(1-t) + q_{2,x}t^2 \qquad \text{EQ. 25}$$

$$y = q_{0,y}(1-t)^2 + q_{1,y}2t(1-t) + q_{2,y}t^2 \qquad \text{EQ. 26}$$

where $$q_{0,x} = c_{0,x} \qquad \text{EQ. 27}$$

$$q_{1,x} = c_{0,x} + \frac{c_{1,x}}{2} \qquad \text{EQ. 28}$$

$$q_{2,x} = c_{0,x} + c_{1,x} + c_{2,x} \qquad \text{EQ. 29}$$

$$q_{0,y} = c_{0,y} \qquad \text{EQ. 30}$$

$$q_{1,y} = c_{0,y} + \frac{c_{1,y}}{2} \qquad \text{EQ. 31}$$

$$q_{2,y} = c_{0,y} + c_{1,y} + c_{2,y} \qquad \text{EQ. 32}$$

Figure 6B:
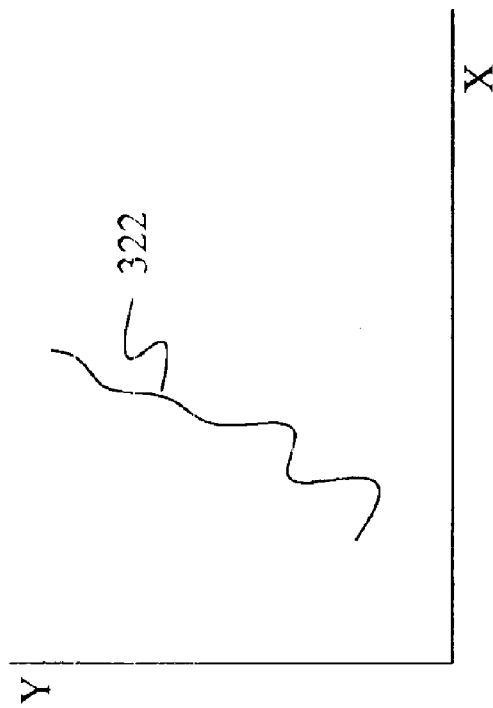
FIGS. 6A and 6B show a bilinear transform of a curve under an embodiment of the present invention.
Figure 6A:
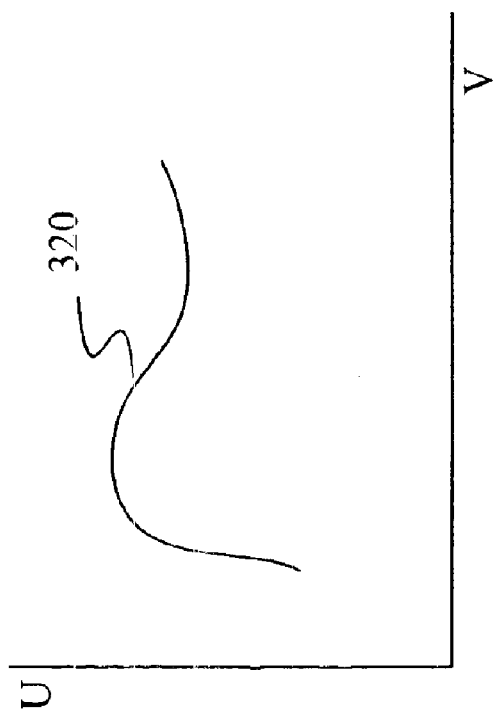

Based on equations 3 and 4, it can be seen that a path of order n in the base image becomes a path of order 2n in the transformed image. Thus, under embodiments of the present invention, cubic curve 320 of FIG. 6A, which is described by:

$$u = t^3 a_{3,u} + t^2 a_{2,u} + t a_{1,u} + a_{0,u} \qquad \text{EQ. 33}$$

$$v = t^3 a_{3,v} + t^2 a_{2,v} + t a_{1,v} + a_{0,v} \qquad \text{EQ. 34}$$

becomes sixth order curve 322 of FIG. 6B when it is transformed, where sixth order curve 322 is represented by the path:

$$x = c_{6,x}t^6 + c_{5,x}t^5 + c_{4,x}t^4 + c_{3,x}t^3 + c_{2,x}t^2 + c_{1,x}t + c_{0,x} \qquad \text{EQ. 35}$$

$$y = c_{6,y}t^6 + c_{5,y}t^5 + c_{4,y}t^4 + c_{3,y}t^3 + c_{2,y}t^2 + c_{1,y}t + c_{0,y} \qquad \text{EQ. 36}$$

with $$c_{6,x} = a_{3u}a_{3v}\hat{a}_x \qquad \text{EQ. 37}$$

$$c_{5,x} = (a_{3u}a_{2v} + a_{2u}a_{3v})\hat{a}_x \qquad \text{EQ. 38}$$

$$c_{4,x} = (a_{3u}a_{1v} + a_{2u}a_{2v} + a_{1u}a_{3v})\hat{a}_x \qquad \text{EQ. 39}$$

$$c_{3,x} = (a_{3u}a_{0v} + a_{2u}a_{1v} + a_{1u}a_{2v} + a_{0u}a_{3v})\hat{a}_x + a_{3u}\hat{a}_x a_{3v}\tilde{a}_x \qquad \text{EQ. 40}$$

$$c_{2,x} = (a_{2u}a_{0v} + a_{1u}a_{1v} + a_{0u}a_{2v})\hat{a}_x + a_{2u}\hat{a}_x + a_{2v}\tilde{a}_x \qquad \text{EQ. 41}$$

$$c_{1,x} = (a_{1u}a_{0v} + a_{0u}a_{1v})\hat{a}_x + a_{1u}\hat{a}_x + a_{1v}\tilde{a}_x \qquad \text{EQ. 42}$$

$$c_{0,x} = a_{0u}a_{0v}\hat{a}_x + a_{0u}\hat{a}_x + a_{0v}\tilde{a}_x + \ddot{a}_x \qquad \text{EQ. 43}$$

$$c_{6,y} = a_{3u}a_{3v}\hat{a}_y \qquad \text{EQ. 44}$$

$$c_{5,y} = (a_{3u}a_{2v} + a_{2u}a_{3v})\hat{a}_y \qquad \text{EQ. 45}$$

$$c_{4,y} = (a_{3u}a_{1v} + a_{2u}a_{2v} + a_{1u}a_{3v})\hat{a}_y \qquad \text{EQ. 46}$$

$$c_{3,y} = (a_{3u}a_{0v} + a_{2u}a_{1v} + a_{1u}a_{2v} + a_{0u}a_{3v})\hat{a}_y + a_{3u}\hat{a}_y a_{3v}\tilde{a}_y \qquad \text{EQ. 47}$$

$$c_{2,y} = (a_{2u}a_{0v} + a_{1u}a_{1v} + a_{0u}a_{2v})\hat{a}_y + a_{2u}\hat{a}_y + a_{2v}\tilde{a}_y \qquad \text{EQ. 48}$$

$$c_{1,y} = (a_{1u}a_{0v} + a_{0u}a_{1v})\hat{a}_y + a_{1u}\hat{a}_y + a_{1v}\tilde{a}_y \qquad \text{EQ. 49}$$

$$c_{0,y} = a_{0u}a_{0v}\hat{a}_y + a_{0u}\hat{a}_y + a_{0v}\tilde{a}_y + \delta_y \qquad \text{EQ. 50}$$

Perspective Transform

Under other embodiments of the invention, a perspective transform is performed on a path defined in the u,v plane to produce a transformed path in the x,y plane. This involves first transforming the path into a three-dimensional x', y', w' space then projecting the path in the three-dimensional space onto the x,y plane.

The transform into the three-dimensional space can be represented by a matrix expression:

$$(x' \ y' \ w') = (u \ v \ 1) \begin{pmatrix} m_{u,x} & m_{u,y} & m_{u,w} \\ m_{v,x} & m_{v,y} & m_{v,w} \\ m_{1,x} & m_{1,y} & m_{1,w} \end{pmatrix} \qquad \text{EQ. 51}$$

where u and v are each functions of t. The projection onto the xy plane is then formed by dividing the equations for the x' and y' coordinates by the equation for the w' coordinate:

$$x = \frac{x'}{w'} \qquad \text{EQ. 52}$$

$$y = \frac{y'}{w'}. \qquad \text{EQ. 53}$$

From equations 51, 52, and 53 it can be seen that if u and v are described by linear equations, then x and y will also be described by the ratio of linear equations. In fact, if u and v are functions of order n, then x and y are rational functions of order n.

Rendering Bezier Curves

Once the paths have been transformed, either through a bilinear or perspective transform, the transformed equations for x and y must be rendered into individual pixels on a display. When x and y are linear equations, it is relatively easy to convert the equations into individual pixels. However, for more complex x and y equations, the determination of individual pixels is computationally intensive.

Under the prior art, higher order curves are rendered by approximating the higher order curve as a series of lines. Although techniques for identifying these lines have been discussed in the prior art, specific examples have only been given for third order functions. From the examples, those skilled in the art can generate the lines for higher order curves. However, this involves generating a new set of rendering equations for each order curve, a task that is typically done by hand. The prior art does not provide an efficient means for generating the equations needed to render curves of any order. The present invention addresses this problem by providing a method for generating the equations needed to render any order curve.

Any order curve can be described using a Bezier notation. Under that notation, a curve r of order n is described by:

$$r = \sum_{i=0}^{n} B_i^n(t) q_i \qquad \text{EQ. 54}$$

where $q_i$ are the Bézier control points for curve r, and $B_i^n$ are Bernstein polynomials of n-th order that are defined as:

$$\begin{cases} B_i^n(t) = \binom{n}{i} t^i (1-t)^{n-i} & \text{for } 0 \le i \le n \\ B_i^n(t) = 0 & \text{for } i < 0 \text{ or } i > n \end{cases} \quad \text{where} \qquad \text{EQ. 55}$$

$$\binom{n}{i} = \frac{n!}{i!(n-i)!}. \qquad \text{EQ. 56}$$

Under this description of the curve, the locations of the control points, $q_i$, define the shape of the curve. In particular, $q_0$ and $q_n$ define the start and end of the curve. Note that the control points have the same dimensions as the curve they represent. Thus, for the two-dimensional curves produced by a bilinear transform, the control points have two dimensions and for the three-dimensional curves produced by a perspective transform, the control points have three dimensions. Our rendering technique can be applied to Bézier curves of any order and any dimensions.

The general technique of the prior art for determining the series of lines to approximate a curve, r, is described below with reference to a curve 400 shown in FIGS. 7A through 7D, and a flow diagram shown in FIGS. 8A through 8C.

The process of FIG. BA begins at start 500 and continues at step 502 where a variable, NSTEPS, is set to one. "NSTEPS" represents the number of lines that will need to be drawn given the current segment size. Initially, the current segment size is set to the entire length of the curve.

At step 504, the curve over the current segment is examined to determine if it may be approximated by a straight line. To decide this, a straight line is drawn between control points $q_0$ and $q_n$, and a distance is calculated between the straight line and the other control points that define the curve. For example, in FIG. 7A a line 406 is drawn between control points 402 and 404. In most embodiments where the curve is defined in three dimensions, the three-dimensional control points are converted into two-dimensional control points using equations 52 and 53 above before the base line is drawn between the end control points. Thus, the distances are calculated using two-dimensional control points instead of three-dimensional control points. For a higher dimensional curve, the control points projected to a two-dimensional plane are used to calculate the distances. One rational for adopting this approach is that the curve is displayed in two-dimensions so that distances in the third dimension are irrelevant to approximating the curve with a straight two-dimensional line.

In one embodiment, the distance between a control point and the base line is measured along a line that is perpendicular to the base line and that intersects the control point. In some embodiments, the distance is determined by calculating a distance based on the x coordinate and a distance based on the y coordinate. The distance based on x coordinate is the distance between the point's x coordinate, $q_{x,i}$, and a line drawn between the endpoints of the curve, $r_x$, describing the x coordinate. The y coordinate distance is the distance between the y coordinate of the point, $q_{y,i}$, and a line drawn between the endpoints of the curve, $r_y$, describing the y coordinates. The distance with the larger magnitude can be used as the distance between the control point and the line or the square root of the sum of the squares of these two distances can be used as the distance between the control point and the line. In general, the selected distance is known as an error vector, with each control point having a separate error vector.

Figure 8A:
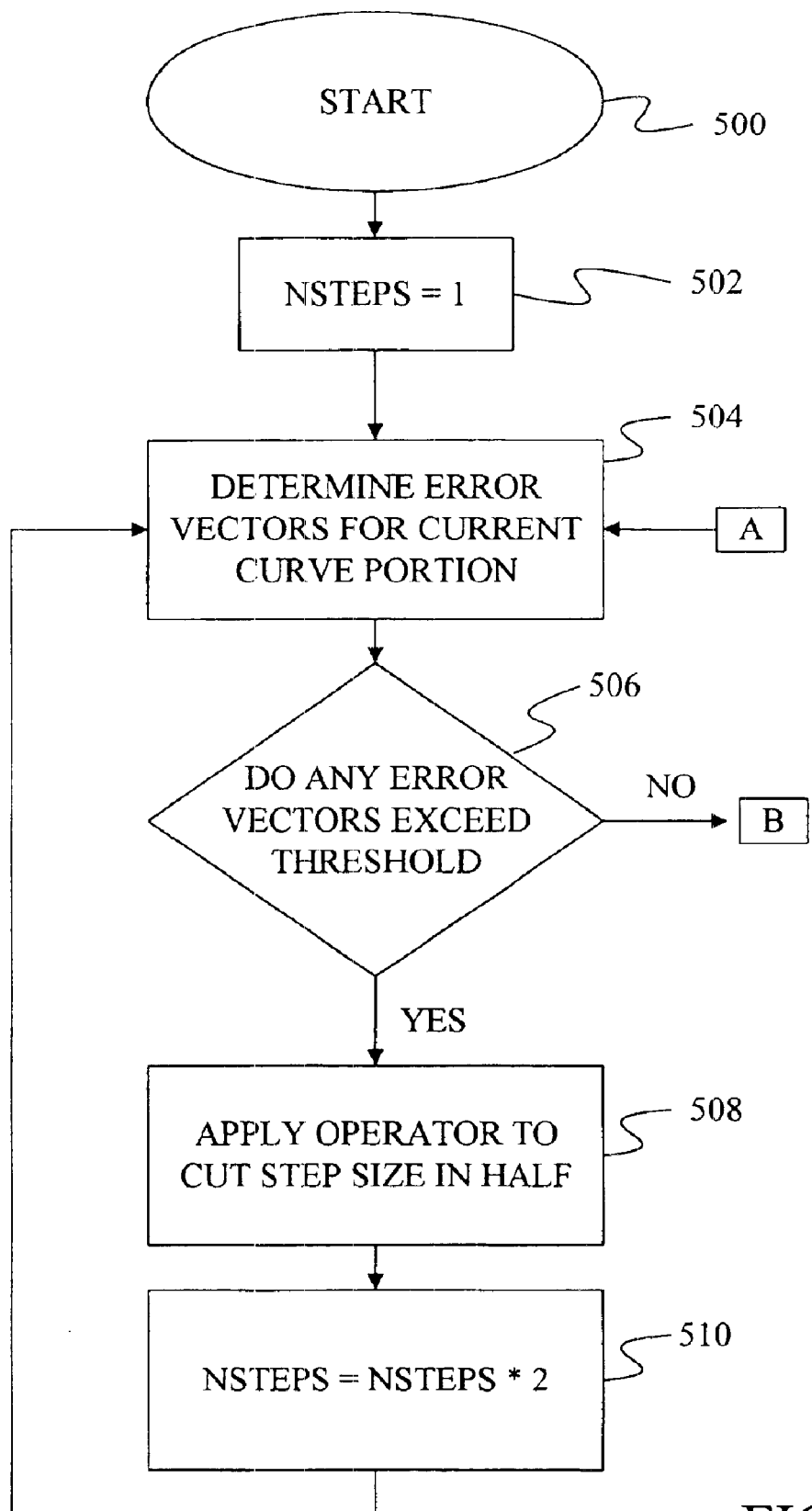
FIGS. 8A, 8B, and 8C show a flow diagram for rendering curves under an embodiment of the invention.

At step 506 of FIG. 8A, the error vectors are compared against a threshold to determine if any of the vectors exceeds the threshold. If one of the vectors exceeds the threshold, the line is not considered to be a sufficient approximation for the curve and the process continues at step 508.

In step 508, the equations describing the curve are altered so that they are functions of t/2 instead of functions of t. This produces equations that describe the first half of the curve. For example, in FIG. 7B, the new equations describe curve segment 408 such that $q_0$ of the new equations still corresponds to point 402 of curve 400 but $q_n$ now corresponds to point 416, midway along curve 400. A technique for generating these "half-step" equations for any order curve is described below.

With the new segment size, the number of lines that needs to be generated doubles. Thus, in step 510, NSTEPS is doubled. The process then returns to step 504 to determine the error vectors for the new curve segment.

Figure 7A:
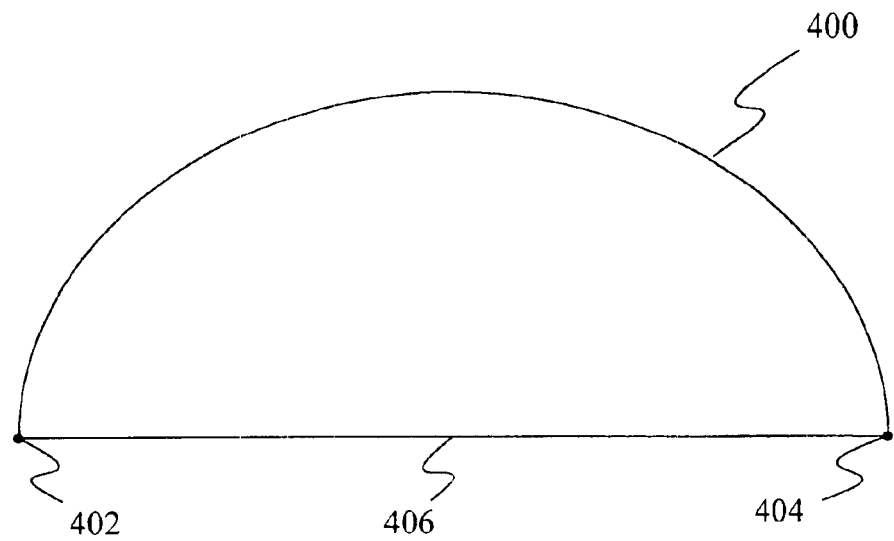
FIGS. 7A, 7B, 7C, and 7D show a curve that is divided into segments under a rendering embodiment of the present invention.
Figure 7B:
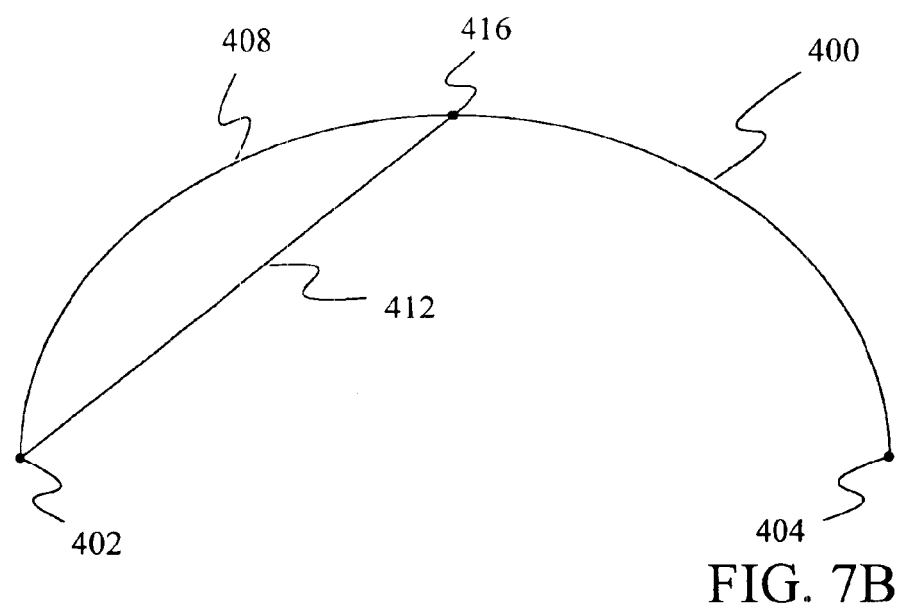
Figure 7C:
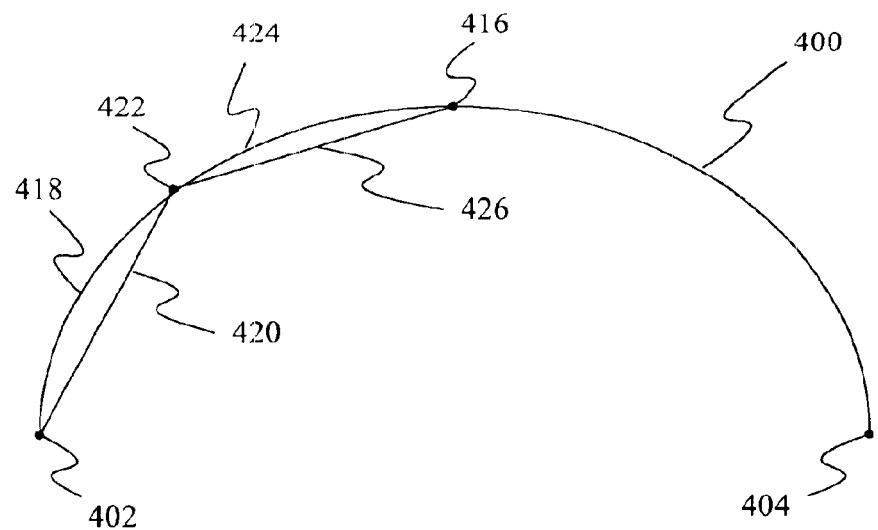
Figure 8B:
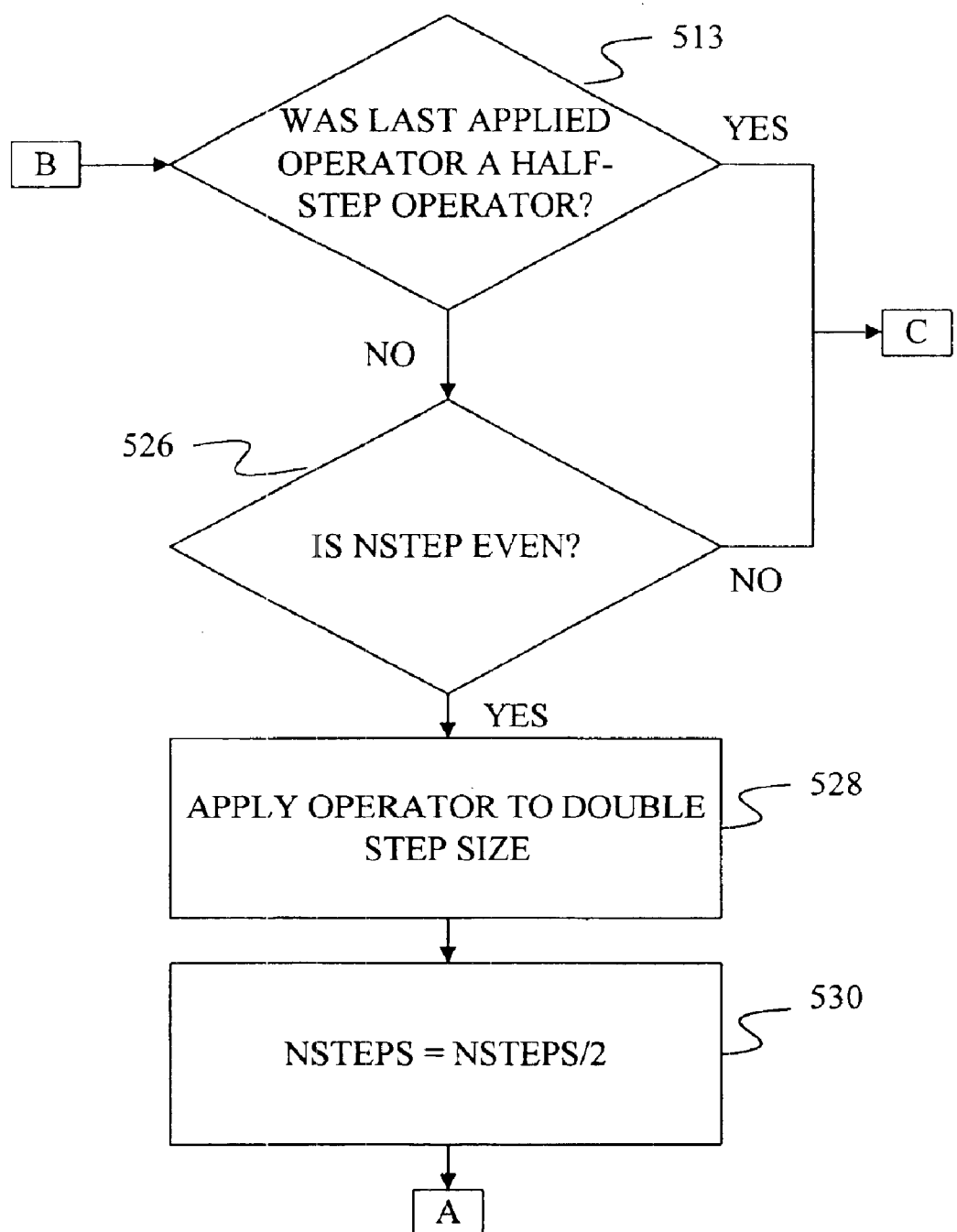

If none of the error vectors of a current curve segment exceed the threshold at step 506, the process continues at step 513 of FIG. 8B. In step 513, the last operation performed to produce the function describing the current curve segment is checked to see if it was a half-step operation. If it was, this is the largest segment that can be represented by a straight line and the process continues at state 516 where the line segment between the end points of the curve is stored in memory for later rendering. For example, if the last operation was a half-step operation to form the functions that describe curve segment 418 of FIG. 7C, line 420 would be stored.

If the last operation performed was not a half-step operation at step 513, then it is possible that a segment twice the size of the current segment could be represented by a straight line.

Before doubling the segment size, the present invention checks NSTEPS to see if it is an even number at step 526. If NSTEPS is odd at step 526, such as for curve segment 424 of FIG. 7C, the segment should not be doubled in size to see if a larger segment can be represented by a straight line. As such, the process continues at step 516 where the straight line for the current segment is stored in memory for later rendering. For example, line 426 of FIG. 7C would be stored for segment 424.

Figure 7D:
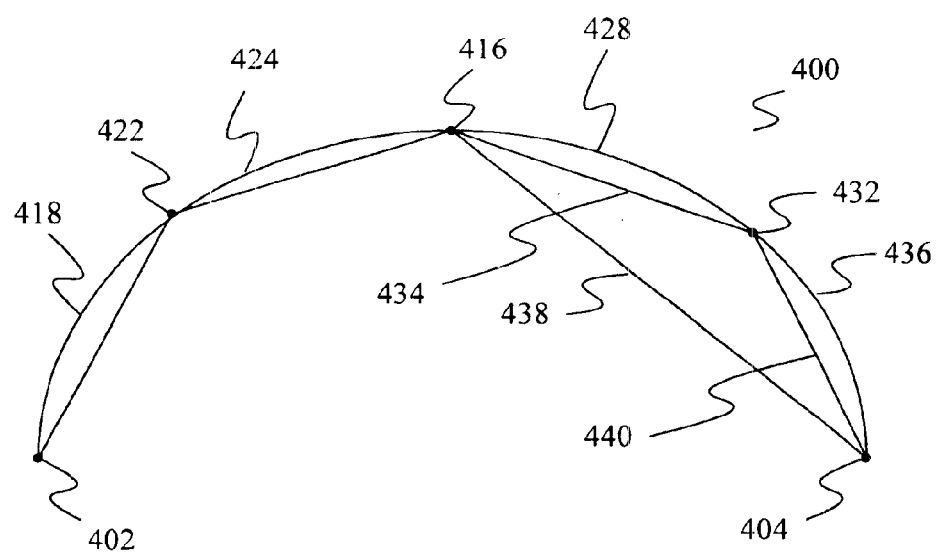

If NSTEPS is even at step 526, the equations describing the curve are changed so that they are functions of 2t instead of t at step 528. This is shown in FIG. 7D where the equations that describe curve segment 428, between points 416 and 432, are changed to describe a curve segment twice as large between points 416 and 404. A method of generating an equation based on 2t from an equation based on t for any order curve is described in more detail below.

With the doubling of the segment size, the number of lines that must be drawn is cut in half. Thus, at step 530, NSTEPS is divided by two. The process then returns to step 504 of FIG. 8A to determine if the larger segment may be approximated by a straight line such as line 438 of FIG. 7D.

Figure 8C:
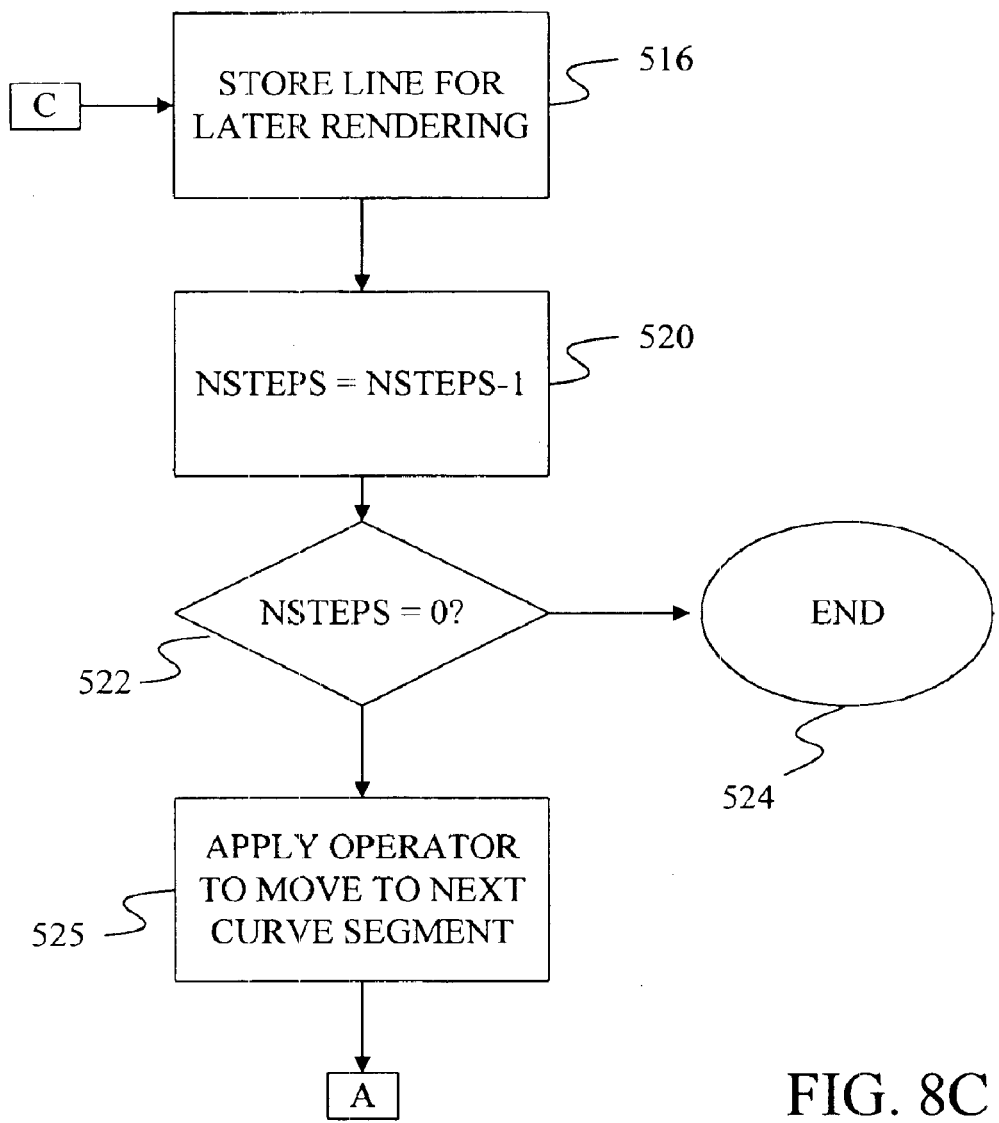

After a line is stored for a curve segment at step 516 of FIG. 8C, NSTEPS is decremented by one at step 520. NSTEPS is then checked to see if it is greater than zero. If NSTEPS is equal to zero, the end of the curve has been reached and the process ends at step 524. If NSTEPS is greater than zero, the process continues at step 525, where the equations describing the last curve segment are changed to describe the next curve segment. This is achieved by changing the equations so that they are based on t+1 instead of t. A technique for changing the equations in this manner for any order curve is discussed further below. In general, step 525 can be referred to as a move operation. An example of a move operation is shown in FIG. 7C where the equations are changed from describing segment 418 to describing segment 424.

After moving to the next segment, the process returns to step 504 of FIG. 8A to determine if the new segment can be represented by a straight line.

As mentioned above, one aspect of the present invention is a method for generating the half-step, double-step and move functions for any order function that defines a curve segment. This method simplifies the creation of these functions for larger order curves, such as the sixth order curve generated above by passing a cubic curve through a bilinear transform.

Under one embodiment of the present invention, a single method is used to generate both the half-step and double step functions. In the prior art, generating the functions involves taking a current Bézier function that is in terms of t, substituting t/c for t, and reorganizing the function so that it is once again in terms of just t. This reorganization changes the control points of the Bézier function, but the order of the function remains the same. Under the method of the present invention, the reorganization of the function is simplified to a simple matrix calculation for converting the previous control points into a set of new control points.

Under one embodiment, the conversion matrix used in these calculations is formed by first re-writing the Bezier function for the curve in terms of a new variable $\tilde{t}$ and a new set of control points $\tilde{q}_i$. Since both functions describe the same curve, they can be set equal to each other as:

$$\sum_{i=0}^{n} B_i^n(t) q_i = \sum_{j=0}^{n} B_j^n(\tilde{t}) \tilde{q}_j. \qquad \text{EQ. 57}$$

Setting $t = c\tilde{t}$ and using the identity:

$$B_i^n(c\tilde{t}) = \sum_{j=0}^{n} B_i^j(c) B_j^n(\tilde{t}) \qquad \text{EQ. 58}$$

equation 57 provides the relationship between the control points of the two different equations as:

$$\tilde{q}_j = \sum_{i=0}^{j} B_i^j(c) q_i. \qquad \text{EQ. 59}$$

If the coordinates of each control point are written in matrix form such that:

$$Q_x = \begin{pmatrix} q_{0,x} \\ q_{1,x} \\ \vdots \\ q_{n,x} \end{pmatrix}, Q_y = \begin{pmatrix} q_{0,y} \\ q_{1,y} \\ \vdots \\ q_{n,y} \end{pmatrix}, \qquad \text{EQ. 60}$$

$$\tilde{Q}_x = \begin{pmatrix} \tilde{q}_{0,x} \\ \tilde{q}_{1,x} \\ \vdots \\ \tilde{q}_{n,x} \end{pmatrix}, \text{ and } \tilde{Q}_y = \begin{pmatrix} \tilde{q}_{0,y} \\ \tilde{q}_{1,y} \\ \vdots \\ \tilde{q}_{n,y} \end{pmatrix}$$

then the relationship of equation 59 can be written as:

$$\tilde{Q}_x = D(c) Q_x \text{ and } \tilde{Q}_y = D(c) Q_y \qquad \text{EQ. 61}$$

where D(c) is a matrix with ij components that are given by:

$$(D(c))_{ij} = B_j^i(c) \qquad \text{EQ. 62}$$

For a half-step conversion, in which a function that describes a curve segment is converted into a function that describes half of the curve segment, c is equal to ½. Using Equation 62, matrix D(c) can be easily generated for any order curve, thus providing a simple means for determining the conversion equations for any order curve. For example, a sixth order curve has a half-step matrix D(½) of:

$$D(1/2) = \begin{bmatrix} 1 & 0 & 0 & 0 & 0 & 0 & 0 \\ 1/2 & 1/2 & 0 & 0 & 0 & 0 & 0 \\ 1/4 & 1/2 & 1/4 & 0 & 0 & 0 & 0 \\ 1/8 & 3/8 & 3/8 & 1/8 & 0 & 0 & 0 \\ 1/16 & 1/4 & 3/8 & 1/4 & 1/16 & 0 & 0 \\ 1/32 & 5/32 & 5/16 & 5/16 & 5/32 & 1/32 & 0 \\ 1/64 & 3/32 & 15/64 & 5/16 & 15/64 & 3/32 & 1/64 \end{bmatrix}. \qquad \text{EQ. 63}$$

Similarly, the double-step matrix D(2) can be easily calculated for any order curve using equation 62. For example, for a sixth order curve, D(2) is easily calculated as:

$$D(2) = \begin{bmatrix} 1 & 0 & 0 & 0 & 0 & 0 & 0 \\ -1 & 2 & 0 & 0 & 0 & 0 & 0 \\ 1 & -4 & 4 & 0 & 0 & 0 & 0 \\ -1 & 6 & -12 & 8 & 0 & 0 & 0 \\ 1 & -8 & 24 & -32 & 16 & 0 & 0 \\ -1 & 10 & -40 & 80 & -80 & 32 & 0 \\ 1 & -12 & 60 & -160 & 240 & -192 & 64 \end{bmatrix}. \qquad \text{EQ. 64}$$

If the curves are described as an n-th order polynomial instead of using the Bezier description, each curve, r, is represented as:

$$r_x = \sum_{i=0}^{n} a_{i,x} t^i \qquad \text{EQ. 65}$$

$$r_y = \sum_{i=0}^{n} a_{i,y} t^i \qquad \text{EQ. 66}$$

If the curves resented by equations 65 and 66 are described in terms of a new variable $\tilde{t}$ and a new set of parameters $\tilde{a}_i$, the following equations are produced:

$$\sum_{i=0}^{n} a_{i,x} t^i = \sum_{i=0}^{n} \tilde{a}_{i,x} \tilde{t}^i \qquad \text{EQ. 67}$$

$$\sum_{i=0}^{n} a_{i,y} t^i = \sum_{i=0}^{n} \tilde{a}_{i,y} \tilde{t}^i. \qquad \text{EQ. 68}$$

Setting t equal to $c\tilde{t}$, in equations 67 and 68 produces the following relationships between the parameters:

$$\tilde{a}_{i,x} = c^i a_{i,x} \qquad \text{EQ. 69}$$

$$\tilde{a}_{i,y} = c^i a_{i,y} \qquad \text{EQ. 70}$$

which can be written in matrix notation as:

$$\tilde{A}_x = D_p(c) A_x \qquad \text{EQ. 71}$$

$$\tilde{A}_y = D_p(c) A_x \qquad \text{EQ. 72}$$

where $$\tilde{A}_x = \begin{pmatrix} \tilde{a}_{0,x} \\ \tilde{a}_{1,x} \\ \vdots \\ \tilde{a}_{n,x} \end{pmatrix}, \tilde{A}_y = \begin{pmatrix} \tilde{a}_{0,y} \\ \tilde{a}_{1,y} \\ \vdots \\ \tilde{a}_{n,y} \end{pmatrix}, A_x = \begin{pmatrix} a_{0,x} \\ a_{1,x} \\ \vdots \\ a_{n,x} \end{pmatrix}, \text{ and } A_y = \begin{pmatrix} a_{0,y} \\ a_{1,y} \\ \vdots \\ a_{n,y} \end{pmatrix} \qquad \text{EQ. 73}$$

and $$D_p(c) = \begin{bmatrix} 1 & 0 & 0 & 0 & 0 \\ 0 & c & 0 & 0 & 0 \\ 0 & 0 & c^2 & 0 & 0 \\ 0 & 0 & 0 & \ddots & 0 \\ 0 & 0 & 0 & 0 & c^n \end{bmatrix}. \quad \text{EQ. 74}$$

When a curve is defined in higher dimensions than two, each component will follow the same relation as Equations 71 and 72.

Embodiments of the present invention also provide a means for generating the move functions that are the result of changing a current function from representing one curve segment to representing a neighboring curve segment of equal length. Using equation 57 above, with $t=\tilde{t}+1$, the identity:

$$B_j^n(\tilde{t}+1) = (-1)^{n-j} \sum_{i=n-j}^{n} \binom{i}{n-j} 2^{i-(n-j)} B_i^n(\tilde{t}) \quad \text{EQ. 75}$$

can be used to generate the following relationship between the control points of the two functions:

$$\tilde{q}_j = \sum_{i=n-j}^{n} (-1)^{n-i} \binom{j}{n-i} 2^{j-(n-i)} q_i. \quad \text{EQ. 76}$$

This can be described in a matrix form as:

$$\tilde{Q} = S^{(n)} Q \quad \text{EQ. 77}$$

where $$Q_x = \begin{pmatrix} q_{0,x} \\ q_{1,x} \\ \vdots \\ q_{n,x} \end{pmatrix}, Q_y = \begin{pmatrix} q_{0,y} \\ q_{1,y} \\ \vdots \\ q_{n,y} \end{pmatrix}, \quad \text{EQ. 78}$$

$$\tilde{Q}_x = \begin{pmatrix} \tilde{q}_{0,x} \\ \tilde{q}_{1,x} \\ \vdots \\ \tilde{q}_{n,x} \end{pmatrix}, \text{ and } \tilde{Q}_y = \begin{pmatrix} \tilde{q}_{0,y} \\ \tilde{q}_{1,y} \\ \vdots \\ \tilde{q}_{n,y} \end{pmatrix}$$

and the ijth element of $S^{(n)}$, $S_{ij}^n$, is defined as:

$$S_{ij}^n \equiv (S^{(n)})_{ij} = (-1)^{n-j} \binom{i}{n-j} 2^{i-(n-j)}. \quad \text{EQ. 79}$$

Thus, embodiments of the present invention provide a simple means for generating a matrix to convert a function from representing one curve segment to representing a neighboring curve segment.

If the function for the curve segment is in the form of a polynomial, equations 67 and 68 above can be used to generate the transform matrix by setting $t=\tilde{t}+1$. This produces a transform matrix $S_p$ that has ijth components defined as:

$$S_{pij} = \binom{j}{i} \quad \text{EQ. 80}$$

and which can be used to determine the parameters $\tilde{A}_x$, $\tilde{A}_y$ for the new curve segment from the parameters $A_x$, $A_y$ for the current segment using:

$$\tilde{A}_x = S_p A_x \quad \text{EQ. 81}$$

$$\tilde{A}_y = S_p A_y \quad \text{EQ. 82}$$

where $$\tilde{A}_x = \begin{pmatrix} \tilde{a}_{0,x} \\ \tilde{a}_{1,x} \\ \vdots \\ \tilde{a}_{n,x} \end{pmatrix}, \tilde{A}_y = \begin{pmatrix} \tilde{a}_{0,y} \\ \tilde{a}_{1,y} \\ \vdots \\ \tilde{a}_{n,y} \end{pmatrix}, \quad \text{EQ. 83}$$

$$A_x = \begin{pmatrix} a_{0,x} \\ a_{1,x} \\ \vdots \\ a_{n,x} \end{pmatrix}, \text{ and } A_y = \begin{pmatrix} a_{0,y} \\ a_{1,y} \\ \vdots \\ a_{n,y} \end{pmatrix}.$$

Embodiments of the present invention also provide a method for converting a polynomial representation of a path into a Bézeir representation of the path. The method involves generating a conversion matrix that is determined by setting the Bézier representation of the path found in Equation 54 equal to the polynomial representation of the path found in Equations 65 and 66 above. This produces:

$$r = \sum_{i=0}^{n} B_i^n(t) q_i = \sum_{j=0}^{n} a_j t^j. \quad \text{EQ. 84}$$

Using the identity:

$$t^j = \frac{1}{\binom{n}{j}} \sum_{i=j}^{n} \binom{i}{j} B_i^n(t) \quad \text{EQ. 85}$$

equation 84 can be modified to produce:

$$q_i = \sum_{j=0}^{n} H_{ij}^n a_j \quad \text{EQ. 86}$$

where $$H_{ij}^n = \frac{\binom{i}{j}}{\binom{n}{j}}. \quad \text{EQ. 87}$$

Using equation 87, an n-by-n matrix H can be created to convert the polynomial coefficients into a set of Bézier control points through the matrix equations:

$$Q_x = H A_x \quad \text{EQ. 88}$$

$$Q_y = H A_y \quad \text{EQ. 89}$$

where $$Q_x = \begin{pmatrix} q_{0,x} \\ q_{1,x} \\ \vdots \\ q_{n,x} \end{pmatrix}, Q_y = \begin{pmatrix} q_{0,y} \\ q_{1,y} \\ \vdots \\ q_{n,y} \end{pmatrix},$$

EQ. 90

$$A_x = \begin{pmatrix} a_{0,x} \\ a_{1,x} \\ \vdots \\ a_{n,x} \end{pmatrix}, \text{ and } A_y = \begin{pmatrix} a_{0,y} \\ a_{1,y} \\ \vdots \\ a_{n,y} \end{pmatrix}.$$

An inverse relationship is also provided for converting Bézier control points into polynomial coefficients that describe the same path. That inverse relationship is:

$$A_x = GQ_x$$ EQ. 91

$$A_y = GQ_y$$ EQ. 92 where $$Q_x = \begin{pmatrix} q_{0,x} \\ q_{1,x} \\ \vdots \\ q_{n,x} \end{pmatrix}, Q_y = \begin{pmatrix} q_{0,y} \\ q_{1,y} \\ \vdots \\ q_{n,y} \end{pmatrix}, A_x = \begin{pmatrix} a_{0,x} \\ a_{1,x} \\ \vdots \\ a_{n,x} \end{pmatrix}, \text{ and } A_y = \begin{pmatrix} a_{0,y} \\ a_{1,y} \\ \vdots \\ a_{n,y} \end{pmatrix}$$

EQ. 93 and the ij elements of G are defined as:

$$G_{ij}^n = (-1)^{i-j} \binom{i}{j}\binom{n}{i}.$$ EQ. 94

Equations 62 and 79 above can also be represented as special cases for a more generalized description of selecting a new line segment. Specifically, we can describe t as extending from a point $t_1$ to a point $t_2$ using the following equation:

$$t = t_1(1-\tilde{t}) + t_2\tilde{t}$$ EQ. 95 where t goes from $t_1$ to $t_2$ as $\tilde{t}$ goes from 0 to 1. Using the following identity:

$$B_j^n(t_1(1-\tilde{t}) + t_2\tilde{t}) = \sum_{i=0}^n \sum_{k=0}^j B_k^{n-i}(t_1) B_{j-k}^i(t_2) B_i^n(\tilde{t})$$ EQ. 96 the transformation rule for the coefficients are:

$$\tilde{q}_j = \sum_{i=0}^n \sum_{k=0}^j B_k^{n-j}(t_1) B_{i-k}^j(t_2) q_i.$$ EQ. 97

Equation 97 can be rewritten in terms of matrices as:

$$\tilde{Q} = K^{(n)}(t_1, t_2) Q$$ EQ. 98 with the matrix element given as:

$$K_{ij}^n \equiv (K^{(n)}(t_1, t_2))_{ij} = \sum_{k=0}^j B_k^{n-i}(t_1) B_{j-k}^i(t_2).$$ EQ. 99

Using this generalized description, Equation 62 can be seen as a specific case where:

$$D_{ij}(c) = K_{ij}^n(0, c)$$ EQ. 100 and Equation 79 can be viewed as a specific case where:

$$S_{ij}^n = K_{ij}^n(1, 2).$$ EQ. 101

API for Transforming and Rendering Paths

Some embodiments of the present invention provide Application Programming Interfaces (API) that transform a path using the perspective or bilinear transform discussed above and then render the transformed path using the rendering technique described above. Under one such embodiment, an API for transforming and drawing a path is invoked using the API call DrawWarpPath(p, pen, dstPoints, dstCount, srcRect, srcUnit, quadMode) where p is the path to be transformed, pen is a pen type to be used when drawing the path, dstPoints is a list of edges for a quadrilateral that defines the transform, dstCount is three when the defining quadrilateral is a parallelogram and four otherwise, srcRect are points that describe a source rectangle in terms of a unit measure found in srcUnit, and quadMode is either bilinear or perspective. In other embodiments, an API for transforming and filling a path is invoked using the API call FillWarpPath(p, b, dstPoints, dstCount, srcRect, srcUnit, quadMode) where the parameters that are found in both DrawWarpPath and FillWarpPath have the same properties and the parameter b in FillWarpPath is a brush style that describes the texture, and color to be used to fill the path. In some embodiments, that path parameter passed to the API is a list of paths to be rendered on the screen.

Figure 9:
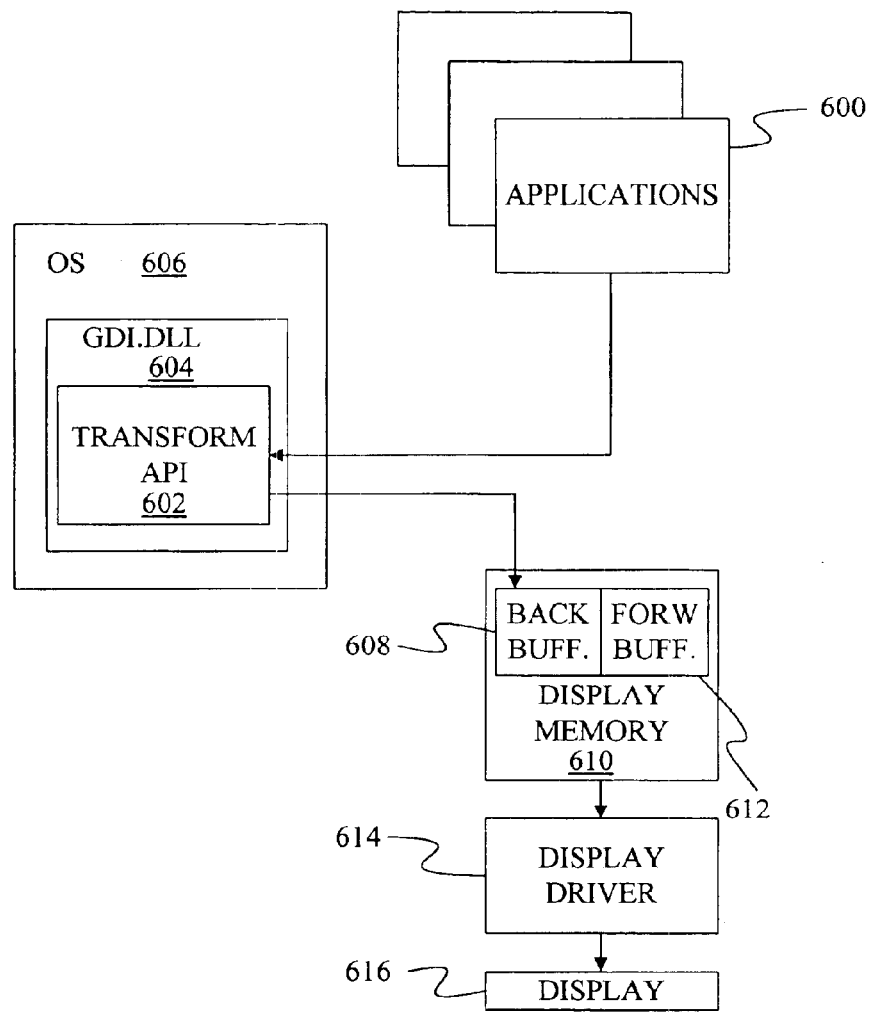
FIG. 9 shows a block diagram of software and hardware components associated with an embodiment of the present invention.

FIG. 9 shows a block diagram of software and hardware components that are utilized with the API's described above. In FIG. 9, an application 600 calls a transform API 602, such as DrawWarpPath and FillWarpPath above. In the embodiment of FIG. 9, the transform API is packaged as part of a graphics device interface 604 (GDI.DLL) within an operating system 606 such as Windows 95®, Windows 98®, Windows® 2000, or Windows NT® from Microsoft Corporation of Redmond, Wash. Transform API 602 transforms the path provided by the application and renders the transformed path into a back buffer 608 of a display memory 610. Back buffer 608 is periodically swapped with a forward buffer 612, which is accessed by a display driver 614 to provided display values to a display 616 thereby displaying the transformed path.

Figure 10:
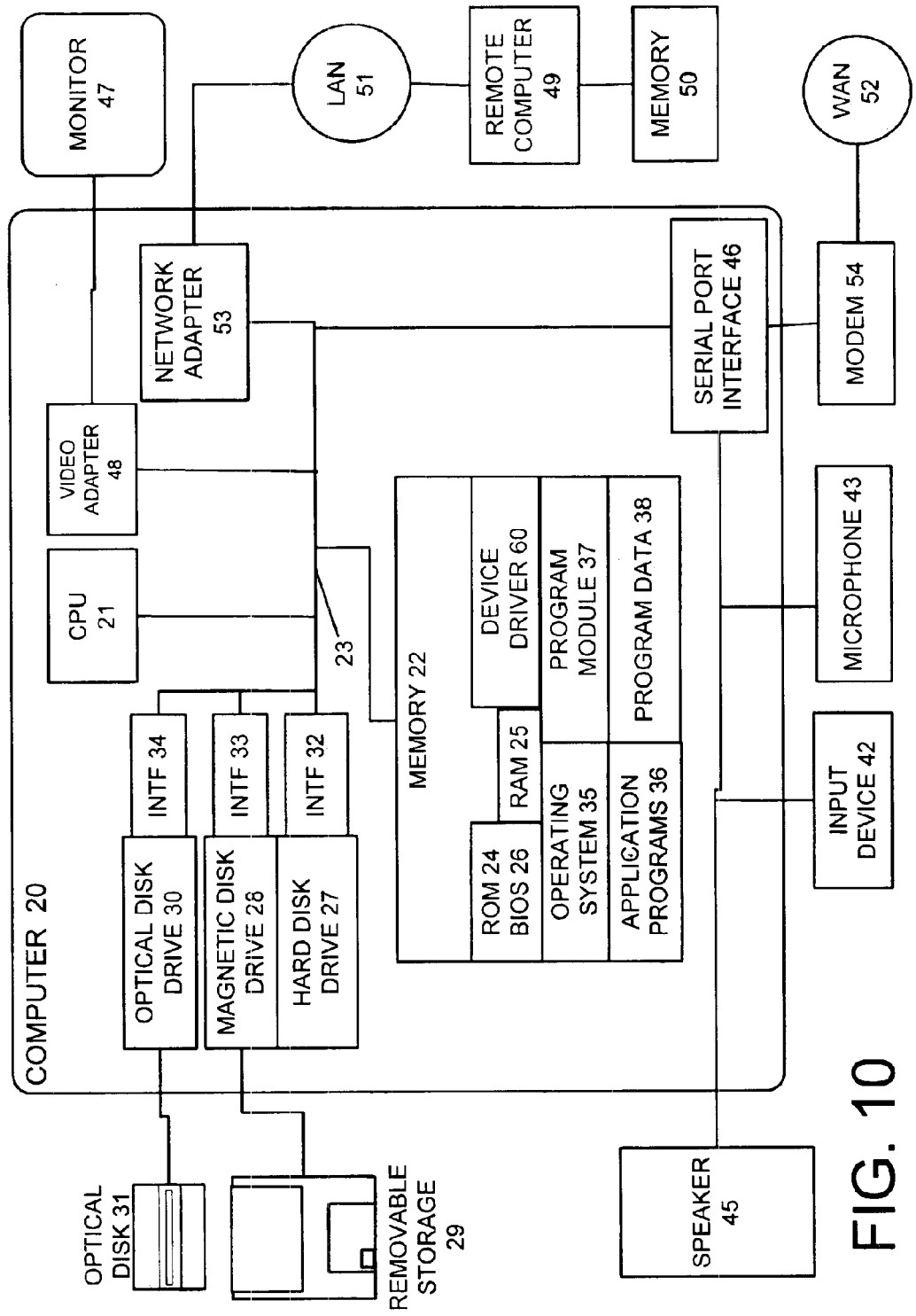
FIG. 10 shows a block diagram of a suitable computing environment in which embodiments of the present invention may be practiced.

FIG. 10 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 10, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 10. The logic connections depicted in FIG. 10 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although the present invention has been described with reference to particular embodiments, workers skilled in the art will recognize that changes may be made in form and detail without departing from the spirit and scope of the invention.

What is claimed is:

1. A method of displaying an image on a computer screen, the method comprising:

describing at least a portion of a base image as a path, the path representing multiple pixels;

performing a non-affine transform on the path instead of the multiple pixels represented by the path to produce a transformed path of the form $$\sum_{i=0}^{n} B_i^n(t) q_i$$

where t is between zero and one; and rendering the transformed path onto the computer screen by approximating the transformed path as a series of lines, wherein approximating the transformed path as a series of lines comprises:

converting the transformed path from a function that describes an entire curve to a function of the form $$\sum_{j=0}^{n} B_j^n(t) \tilde{q}_j$$

that describes a segment of the curve by setting each $$\tilde{q}_j = \sum_{i=0}^{j} B_i^j(d) q_i$$

where c is a fixed fraction; and determining if the segment of the curve can be replaced by a straight line based on the function that describes the segment.

2. The method of claim 1 wherein approximating the transformed path as a series of lines further comprises:

converting a function of the form $$\sum_{i=0}^{n} B_i^n(t) q_i$$

that describes a segment of the curve into a function of the form $$\sum_{j=0}^{n} B_j^n(t) \tilde{q}_j$$

that describes a larger segment of the curve by setting each $$\tilde{q}_j = \sum_{i=0}^{j} B_i^j(d) q_i$$

where d is a fixed value that is greater than one; and determining if the larger segment of the curve can be replaced by a straight line based on the function that describes the segment.

3. The method of claim 1 wherein approximating the transformed path as a series of lines further comprises:

converting a function of the form $$\sum_{i=0}^{n} B_i^n(t) q_i$$

that describes a segment of the curve into a function of the form $$\sum_{j=0}^{n} B_j^n(t) \tilde{q}_j$$

that describes a neighboring segment of the curve by setting each $$\tilde{q}_j = \sum_{i=n-j}^{n} (-1)^{n-i} \binom{j}{n-i} 2^{j-(n-i)} q_i;$$

and determining if the neighboring segment of the curve can be replaced by a straight line based on the function that describes the segment.

4. A method of displaying an image on a computer screen, the method comprising:

describing at least a portion of a base image as a path, the path representing multiple pixels;

performing a non-affine transform on the path instead of the multiple pixels represented by the path to produce a transformed path of the form $$r = \sum_{i=0}^{n} a_i t^i$$

where t is between zero and one; and rendering the transformed path onto the computer screen by approximating the transformed path as a series of lines and rendering each line in the series of lines, wherein approximating the transformed path as a series of lines comprises:

converting the transformed path from a function that describes an entire curve to a function of the form $$\sum_{j=0}^{n} \tilde{a}_j t^j$$

that describes a segment of the curve by setting each $\tilde{a}_j = c^j a_j$ where c is a fixed fraction; and determining if the segment of the curve can be replaced by a straight line based on the function that describes the segment.

5. The method of claim 4 wherein approximating the transformed path as a series of lines further comprises:

converting a function of the form $$\sum_{i=0}^{n} a_i t^i$$

that describes a segment of the curve into a function of the form $$\sum_{j=0}^{n} \tilde{a}_j t^j$$

that describes a larger segment of the curve by setting each $\tilde{a}_j = d^j a_j$ where d is a fixed value that is greater than one; and determining if the larger segment of the curve can be replaced by a straight line based on the function that describes the segment.

6. The method of claim 4 wherein approximating the transformed path as a series of lines further comprises:

converting a function of the form $$\sum_{i=0}^{n} a_i t^i$$

that describes a segment of the curve into a function of the form $$\sum_{j=0}^{n} \tilde{a}_j t^j$$

that describes a neighboring segment of the curve by setting each $$\tilde{a}_j = \sum_{i=j}^{n} \frac{i!}{j!(i-j)!} a_i;$$

and determining if the neighboring segment of the curve can be replaced by a straight line based on the function that describes the segment.

7. A method of displaying an image on a computer screen, the method comprising:

describing at least a portion of a base image as a path, the path representing multiple pixels;

performing a non-affine transform on the path instead of the multiple pixels represented by the path to produce a transformed path; and rendering the transformed path onto the computer screen;

wherein performing a non-affine transform and rendering the transformed path comprise:

issuing a call to a server process while passing parameters comprising the path of the base image and a type of non-affine transform; and processing the call in the server process by performing the transform and rendering the transformed path.

8. The method of claim 7 wherein issuing a call to a server process further comprises passing parameters further comprising corner points for a quadrilateral that defines a transform space.

9. The method of claim 8 wherein issuing a call to a server process further comprises passing parameters further comprising a pen style to be used during rendering.

10. The method of claim 8 wherein passing a path comprises passing a list of paths.

11. The method of claim 10 wherein issuing a call to a server process further comprises passing parameters further comprising a brush style for filling a space between at least two rendered transformed paths.

12. A method for rendering a curve on a computer screen comprising:

converting a function of the form $$\sum_{i=0}^{n} \frac{n!}{i!(n-i)!} t^i (1-t)^{n-i} q_i$$

that describes a segment of the curve into a function of the form $$\sum_{j=0}^{n} \frac{n!}{j!(n-j)!} t^j (1-t)^{n-j} \tilde{q}_j$$

that describes a different sized segment of the curve by setting each $$\tilde{q}_j = \sum_{i=0}^{j} \frac{j!}{i!(j-i)!} c^i (1-c)^{j-i} \tilde{q}_i$$

where c is a fixed value that determines the segment size;

determining if the different sized segment of the curve can be replaced by a straight line based on the function that describes the segment; and rendering the straight line onto the computer screen if the straight line replaced the segment.

13. A method for rendering a curve on a computer screen comprising:

converting a function of the form $$\sum_{i=0}^{n} \frac{n!}{i!(n-i)!} t^i (1-t)^{n-i} q_i$$

that describes a segment of the curve into a function of the form $$\sum_{j=0}^{n} \frac{n!}{j!(n-j)!} t^j (1-t)^{n-j} \tilde{q}_j$$

that describes an adjacent segment of the curve by setting each $$\tilde{q}_j = \sum_{i=n-j}^{n} (-1)^{n-i} \binom{j}{n-i} 2^{j-(n-i)} q_i;$$

determining if the adjacent segment of the curve can be replaced by a straight line based on the function that describes the segment; and rendering the straight line onto the computer screen if the straight line replaced the segment.

14. A method for rendering a curve on a computer screen comprising:

converting a function of the form $$\sum_{i=0}^{n} a_i t^i$$

that describes a segment of the curve into a function of the form $$\sum_{i=0}^{n} \tilde{a}_j t^j$$

that describes a different sized segment of the curve by setting each $\tilde{a}_j = c^j a_j$ where c is a fixed value that determines the segment size;

determining if the different sized segment of the curve can be replaced by a straight line based on the function that describes the segment; and rendering the straight line onto the computer screen if the straight line replaced the segment.

15. A method for rendering a curve on a computer screen comprising:

converting a function of the form $$\sum_{i=0}^{n} a_i t^i$$

that describes a segment of the curve into a function of the form $$\sum_{i=0}^{n} \tilde{a}_j t^j$$

that describes an adjacent segment of the curve by setting each $$\tilde{a}_j = \sum_{i=j}^{n} \frac{i!}{j!(i-j)!} a_i;$$

determining if the adjacent segment of the curve can be replaced by a straight line based on the function that describes the segment; and rendering the straight line onto the computer screen if the straight line replaced the segment.

16. A computer-readable medium having computer-executable components for performing steps comprising:

converting a function of the form $$\sum_{i=0}^{n} \frac{n!}{i!(n-i)!} t^i (1-t)^{n-i} q_i$$

that describes a segment of the curve into a function of the form $$\sum_{j=0}^{n} \frac{n!}{j!(n-j)!} t^j (1-t)^{n-j} \tilde{q}_j$$

that describes a different sized segment of the curve by setting each $$\tilde{q}_j = \sum_{i=0}^{j} \frac{j!}{i!(j-i)!} c^i (1-c)^{j-i} q_i$$

where c is a fixed value that determines the segment size;

determining if the different sized segment of the curve can be replaced by a straight line based on the function that describes the segment; and rendering the straight line onto the computer screen if the straight line replaced the segment.

17. A computer-readable medium having computer-executable components for performing steps comprising:

converting a function of the form $$\sum_{i=0}^{n} \frac{n!}{i!(n-i)!} t^i (1-t)^{n-i} \tilde{q}_i$$

that describes a segment of the curve into a function of the form $$\sum_{j=0}^{n} \frac{n!}{j!(n-j)!} t^j (1-t)^{n-j} \tilde{q}_j$$

that describes an adjacent segment of the curve by setting each $$\tilde{q}_j = \sum_{i=n-j}^{n} (-1)^{n-i} \binom{j}{n-i} 2^{j-(n-i)} q_i;$$

determining if the adjacent segment of the curve can be replaced by a straight line based on the function that describes the segment; and rendering the straight line onto the computer screen if the straight line replaced the segment.

18. A computer-readable medium having computer-executable components for performing steps comprising:

converting a function of the form $$\sum_{i=0}^{n} a_i t^i$$

that describes a segment of the curve into a function of the form $$\sum_{j=0}^{n} \tilde{a}_j t^j$$

that describes a different sized segment of the curve by setting each $\tilde{a}_j = c^j a_j$ where c is a fixed value that determines the segment size;

determining if the different sized segment of the curve can be replaced by a straight line based on the function that describes the segment; and rendering the straight line onto the computer screen if the straight line replaced the segment.

19. A computer-readable medium having computer-executable components for performing steps comprising:

converting a function of the form $$\sum_{i=0}^{n} a_i t^i$$

that describes a segment of the curve into a function of the form $$\sum_{j=0}^{n} \tilde{a}_j t^j$$

that describes an adjacent segment of the curve by setting each $$\tilde{a}_j = \sum_{i=j}^{n} \frac{i!}{j!(i-j)!} a_i;$$

determining if the adjacent segment of the curve can be replaced by a straight line based on the function that describes the segment; and rendering the straight line onto the computer screen if the straight line replaced the segment.

20. A computer-readable medium having computer-executable components for performing steps comprising:

generating a function to describe multiple pixels of an image for a computer screen;

transforming the function instead of the multiple pixels using a non-affine transform to produce a transformed function; and converting the transformed function into a series of lines and converting each line into an image, wherein converting the transformed function into a series of lines comprises:

converting a function of the form $$\sum_{i=0}^{n} \frac{n!}{j!(n-i)!} t^i (1-t)^{n-i} q_i$$

that describes a segment of a curve represented by the transform function into a function of the form $$\sum_{j=0}^{n} \frac{n!}{i!(n-j)!} t^j (1-t)^{n-j} \tilde{q}_j$$

that describes a different sized segment of the curve by setting each $$\tilde{q}_j = \sum_{i=0}^{j} \frac{j!}{i!(j-i)!} c^i (1-c)^{j-i} q_i$$

where c is a fixed value; and determining if the different sized segment of the curve can be replaced by a straight line based on the function that describes the segment.

21. A computer-readable medium having computer-executable components for performing steps comprising:

generating a function to describe multiple pixels of an image for a computer screen;

transforming the function instead of the multiple pixels using a non-affine transform to produce a transformed function; and converting the transformed function into a series of lines and converting each line into an image, wherein converting the transformed function into a series of lines comprises:

converting a function of the form $$\sum_{i=0}^{n} \frac{n!}{i!(n-i)!} t^i (1-t)^{n-i} q_i$$

that describes a segment of a curve represented by the transform function into a function of the form $$\sum_{j=0}^{n} \frac{n!}{j!(n-j)!} t^j (1-t)^{n-j} \tilde{q}_j$$

that describes an adjoining segment of the curve by setting each $$\tilde{q}_j = \sum_{i=n-j}^{n} (-1)^{n-i} \binom{j}{n-i} 2^{j-(n-i)} q_i;$$

and determining if the adjoining segment of the curve can be replaced by a straight line based on the function that describes the segment.

22. A computer-readable medium having computer-executable components for performing steps comprising:

generating a function to describe multiple pixels of an image for a computer screen;

transforming the function instead of the multiple pixels using a non-affine transform to produce a transformed function; and converting the transformed function into a series of lines and converting each line into an image, wherein converting the transformed function into a series of lines comprises:

converting a function of the form $$\sum_{i=0}^{n} a_i t^i$$

that describes a segment of a curve represented by the transform function into a function of the form $$\sum_{j=0}^{n} \tilde{a}_j t^j$$

that describes a different sized segment of the curve by setting each $\tilde{a}_j = c^j a_j$ where c is a fixed value; and determining if the different sized segment of the curve can be replaced by a straight line based on the function that describes the segment.

23. A computer-readable medium having computer-executable components for performing steps comprising:

generating a function to describe multiple pixels of an image for a computer screen;

transforming the function instead of the multiple pixels using a non-affine transform to produce a transformed function; and converting the transformed function into a series of lines and converting each line into an image, wherein converting the transformed function into a series of lines comprises:

converting a function of the form $$\sum_{i=0}^{n} a_i t^i$$

that describes a segment of a curve represented by the transform function into a function of the form $$\sum_{j=0}^{n} \tilde{a}_j t^j$$

that describes an adjoining segment of the curve by setting each $$\tilde{a}_j = \sum_{i=j}^{n} \frac{i!}{j!(i-j)!} a_i;$$

and determining if the adjoining segment of the curve can be replaced by a straight line based on the function that describes the segment.

* * * * *